United States Patent
Kroesche et al.

(10) Patent No.: US 6,968,444 B1
(45) Date of Patent: Nov. 22, 2005

(54) MICROPROCESSOR EMPLOYING A FIXED POSITION DISPATCH UNIT

(75) Inventors: David E. Kroesche, Round Rock, TX (US); Michael T. Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 483 days.

(21) Appl. No.: 10/287,301

(22) Filed: Nov. 4, 2002

(51) Int. Cl.[7] .............................................. G06F 9/30
(52) U.S. Cl. ........................ 712/208; 712/212; 712/215
(58) Field of Search ........................... 712/23, 24, 208, 712/212, 215

(56) References Cited

U.S. PATENT DOCUMENTS

2003/0154358 A1   8/2003   Seong et al.

OTHER PUBLICATIONS

Eyre et al., "Carmel Enables Customizable DSP", Microprocessor Report, vol. 12, No. 17, Dec. 28, 1998, 6 pgs.

"Microprocessor Watch", In-Stat MDR, Issue #24 MicroDesign Resources, Nov. 11, 1999, 3 pgs.

Primary Examiner—William M. Treat
(74) Attorney, Agent, or Firm—Meyertons Hood Kivlin Kowert & Goetzel, P.C.; B. Noël Kivlin

(57) ABSTRACT

A microprocessor employing a fixed position dispatch unit. The microprocessor includes a plurality of execution units each corresponding to an issue position and configured to execute a common subset of instructions. At least a first one of the execution units includes extended logic for executing a designated instruction that others of the execution units may be incapable of executing. The microprocessor also includes a plurality of decoders coupled to the plurality of execution units. The plurality of decoders may provide positional information to cause the designated instruction to be routed to the first execution unit. Further, the microprocessor includes a dispatch control unit configured to dispatch during a dispatch cycle, the designated instruction for execution by the first execution unit based upon the positional information. The dispatch control unit may further dispatch one or more instructions within the common subset of instructions during the same dispatch cycle.

21 Claims, 3 Drawing Sheets

MICROPROCESSOR EMPLOYING A FIXED POSITION DISPATCH UNIT

BACKGROUND OF THE INVENTION

1. Field of the Invention

This invention relates to the field of superscalar microprocessors and, more particularly, to the dispatch and scheduling of instructions to execution units within a microprocessor.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ a multiple dispatch model of instruction processing. The multiple dispatch model refers to the ability to dispatch multiple instructions for execution simultaneously. This is in contrast to the single dispatch model, wherein a single instruction is dispatched for execution at one time. When multiple instructions are dispatched simultaneously, it is possible for one or more of the simultaneously dispatched instructions to require a specialized execution unit. This may arise when a given instruction requires an execution unit that performs a particular function that the other execution units may not perform. For example, integer multiply instructions may only be performed by the execution unit in position two or a floating-point compare may only be performed by the execution unit in position three. Currently, there may be no way for the scheduling and dispatch logic to know with which execution position a particular instruction is associated. One common way to force an instruction to a given execution position is to designate this type of instruction as a microcode instruction.

When a microcode instruction is dispatched to a particular execution position, no other instructions may be dispatched for execution by the remaining execution units during that dispatch cycle. Thus, depending on how many special instructions exist and when instructions are issued to the execution units, execution slots in various stages of the execution pipelines may go unused. This may lead to inefficiencies due to the various pipeline stages not being full.

SUMMARY OF THE INVENTION

Various embodiments of a microprocessor employing a fixed position dispatch unit are disclosed. In one embodiment, a microprocessor includes a plurality of execution units each corresponding to an issue position and configured to execute a common subset of instructions. However, at least a first one of the plurality of execution units includes extended logic which may be configured to execute a designated instruction that others of the plurality of execution units may be incapable of executing such as a multiply instruction, for example. The microprocessor also includes a plurality of decoders coupled to the plurality of execution units. The plurality of decoders may be configured to provide positional information to cause the designated instruction to be routed to the first execution unit. Further, the microprocessor includes a dispatch control unit coupled to the plurality of decoders and configured to dispatch during a dispatch cycle, the designated instruction for execution by the first execution unit based upon the positional information. The dispatch control unit may be further configured to dispatch one or more instructions within the common subset of instructions during the same dispatch cycle.

In one specific implementation, the dispatch control unit may further include an instruction queue which may be configured to store pending instructions of the common subset of instructions and the designated instruction and to output for dispatch one or more of the pending instructions in each dispatch cycle.

In another specific implementation, the positional information may be a position bit which indicates that the designated instruction is associated with an issue position corresponding to the first execution unit. However, in yet another specific implementation, the positional information may be a position vector including a plurality of bits, each corresponding to a respective one of the issue positions.

Figure 1:
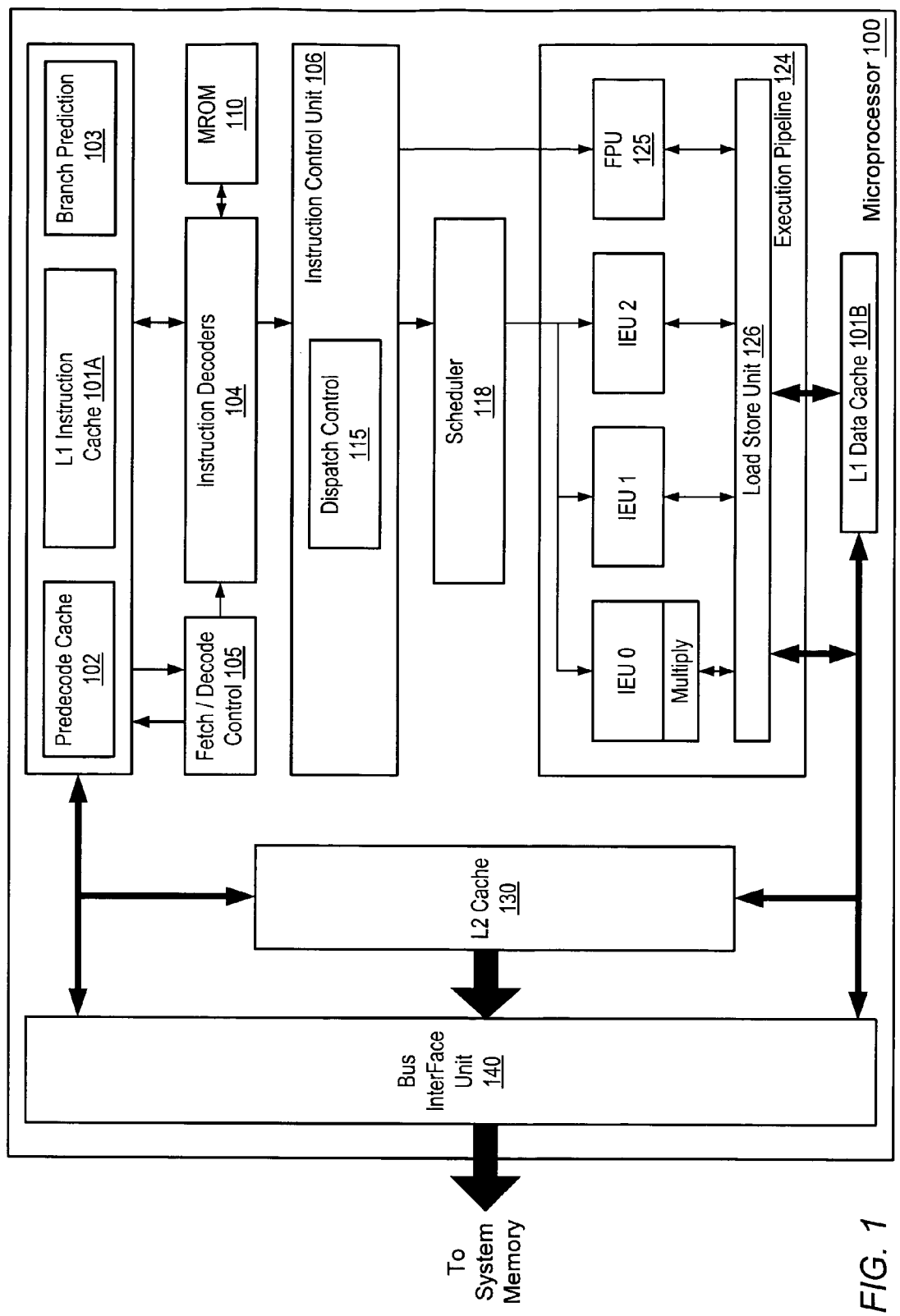
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of an exemplary microprocessor 100 is shown. Microprocessor 100 is configured to execute instructions stored in a system memory (not shown in FIG. 1). Many of these instructions operate on data stored in the system memory. In one embodiment, microprocessor 100 is an example of a microprocessor which implements the x86 architecture. However, other embodiments are contemplated which include other types of architectures.

In the illustrated embodiment, microprocessor 100 includes a level one (L1) cache including an instruction cache 101A and a data cache 101B. Depending upon the implementation, the L1 cache may be a unified cache and as such, instruction cache 101A and data cache 101B may be collectively referred to as L1 cache. Microprocessor 100 also includes a pre-decode cache 102 and branch prediction logic 103 which may be closely coupled with instruction cache 101A. Microprocessor 100 also includes a fetch and decode control unit 105 which is coupled to an instruction decoders 104; both of which are coupled to instruction cache 101A. An instruction control unit 106 may be coupled to receive instructions from instruction decoders 104 and a dispatch control unit 115 within instruction control unit 106 may dispatch operations to a scheduler 118. Further, instruction control unit 106 may be coupled to a microcode read-only memory (MROM) 110. Scheduler 118 is coupled to receive dispatched operations from instruction control unit 106 and to issue operations to execution pipeline 124. Execution pipeline 124 includes three integer execution units 0–2 and floating-point unit 125. Further, execution pipeline 124 includes a load/store unit 126 which may be configured to perform accesses to data cache 101B. Results generated by execution pipeline 124 may be used as operand values for subsequently issued instructions and/or stored to a register file (not shown) within instruction control unit 106. Further, microprocessor 100 includes an on-chip L2 cache 130 which is coupled between instruction cache 101A, data cache 101B and the system memory. It is noted that in alternative embodiments, the L2 cache 130 may be off chip. In addition, it is noted that although dispatch control unit 115 is shown as part of instruction control unit 106, other embodiments are contemplated in which dispatch control unit 115 may be part of scheduler 118.

Instruction cache 101A may store instructions before execution. Functions which may be associated with instruction cache 101A may be instruction loads, instruction prefetching, instruction pre-decoding and branch prediction. Instruction code may be provided to instruction cache 106 by pre-fetching code from the system memory through buffer interface unit 140 or as will be described further below, from L2 cache 130. Instruction cache 101A may be implemented in various configurations (e.g., set-associative, fully-associative, or direct-mapped).

Instructions may be stored into instruction cache 101A by fetch/decode control 105. Instructions may be prefetched prior to the request thereof from instruction cache 101A in accordance with a prefetch scheme. A variety of prefetch schemes may be employed by fetch/decode control 105. As fetch/decode control 105 transfers instructions to instruction cache 101A, fetch/decode control 105 may generate predecode data corresponding to the instructions. For example, in one embodiment, fetch/decode control 105 may generate one or more predecode bits for each byte of the instructions. The predecode bits may form tags indicative of the boundaries of each instruction. The predecode tags may also convey additional information such as whether a given instruction can be decoded directly by instruction decoders 104 or whether the instruction is executed by invoking a microcode procedure controlled by MROM 110. Still further, fetch/decode control 105 may be configured to detect branch instructions and to store branch prediction information corresponding to the branch instructions into branch prediction unit 103. Other embodiments may employ any suitable predecode scheme or no predecode, as desired.

Instruction decoders 104 may be configured to decode instructions into operations which may be either directly decoded or indirectly decoded using operations stored within MROM 110. Instruction decoders 104 may decode certain instructions into operations executable within execution pipeline 124. Simple instructions may correspond to a single operation, while in other embodiments, more complex instructions may correspond to multiple operations. In one embodiment, instruction decoder 104 may include multiple decoders (not shown) for simultaneous decoding of instructions. As instructions are fetched from instruction cache 101A into instruction decoders 104, the corresponding pre-decode data may be scanned to provide information to the decoders and to MROM unit 110 regarding the instructions being fetched. Each instruction may be aligned and decoded into a set of control values in multiple stages depending on whether the instructions are first routed to MROM 110. These control values may be routed in an instruction stream to dispatch control unit 21 along with operand address information and displacement or immediate data which may be included with the instruction. Further, during decoding operations, instruction decoders 104 may access an opcode look-up table (not shown) to determine positional information associated with a given instruction. As will be described in greater detail below, each execution unit may be implemented in stages of a pipeline and each pipeline corresponds to an issue position. Furthermore, some instructions may be executable only by execution units in particular issue positions. Instruction decoders 104 may append the positional information to the instruction or otherwise provide the positional information with the instruction using any suitable means.

Instruction control unit 106 may control dispatching of operations from instruction decoders 104 to execution pipeline 124. As will be described in greater detail below in conjunction with the description of FIG. 2, dispatch control 115 may be configured to receive decoded instructions from instruction decoders 104 and to dispatch multiple instructions each cycle for execution by the execution units within execution pipeline 124 dependent upon positional information included with each instruction. In one embodiment, instruction control unit 106 may also include a reorder buffer for holding operations received from instruction decoder 104. Further, instruction control unit 106 may be configured to control the retirement of operations.

In the illustrated embodiment, the operations and immediate data provided at the outputs of instruction control unit 106 may be routed to scheduler 118 and to floating-point unit (FPU) 125. In one embodiment, scheduler 118 may include multiple integer scheduler units. In such and embodiment, each scheduler may be associated with a dedicated execution unit within execution pipeline 124. In other embodiments, a single scheduler 118 may issue operations to more than one execution unit of execution pipeline 124. It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution pipeline 124. In some embodiments, each scheduler 118 may not provide operand value storage. Instead, each scheduler may monitor issued operations and results available in a register file in order to determine when operand values will be available to be read by execution pipeline 124.

In the illustrated embodiment, execution pipeline 124 includes three integer execution units, designated IEU 0–2. Each one may be configured to execute a common subset of instructions such as integer arithmetic operations such as addition and subtraction, as well as shifts, rotates, logical operations, and branch operations. In addition to the integer arithmetic operations described above, one or more of the integer execution units may include hardware necessary to execute specialized instructions which the other execution units may be incapable of executing. For example, in the illustrated embodiment, IEU 0 is configured to additionally perform integer multiply operations. It is noted that although IEU 0 is shown to perform multiply instructions, other embodiments are contemplated in which any issue position may include hardware necessary to execute additional specialized instructions (e.g., multiply) which the other execution units may be incapable of executing.

Further, execution pipeline 124 includes a floating-point execution unit (FPU) 125 to accommodate floating-point operations. It is noted that FPU 125 may be operated as a coprocessor, receiving MROM instructions from MROM 110 or the reorder buffer (not shown) and subsequently communicating with the reorder buffer to complete the instructions. In one embodiment, FPU 125 may include multiple floating-point pipelines (not shown) including a floating-point scheduler (not shown). One or more of the execution units may be configured to perform address generation for load and store memory operations to be performed by load/store unit 126.

In the illustrated embodiment, each integer execution unit IEU 0–2 corresponds to an issue position (e.g., 0–2). In embodiments having a corresponding number of reservation stations within scheduler 118, a given reservation station may be dedicated to one execution unit and thus an issue position may correspond to both a reservation station and an execution unit.

Load/store unit 126 may be configured to provide an interface between execution pipeline 124 and data cache 101B. In one embodiment, load/store unit 126 may be configured with a load/store buffer (not shown) with several storage locations for data and address information for pending loads or stores. The load/store unit 126 may also perform dependency checking for load instructions against pending store instructions to ensure that data coherency is maintained.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. Similar to instruction cache 101A, in one embodiment data cache 101B may also be implemented in SRAM, although other embodiments are contemplated which may include other types of memory.

L2 cache 130 is also a cache memory and it may be configured to store instructions and/or data. In the illustrated embodiment, L2 cache 130 may be an on-chip cache and may be configured as either fully associative or set associative or a combination of both.

Bus interface unit 140 may be configured to communicate between microprocessor 100 and other components in a computer system (e.g., system memory). In one embodiment, bus interface unit 140 may include buffers (not shown) for buffering write transactions during write cycle streamlining. In addition, bus interface unit 140 may include an interface to any suitable interconnect structure, such as a packet-based interconnect compatible with HyperTransport™ Technology or a shared bus compatible such as an EV-6 bus by Digital Equipment Corporation, for example. In embodiments where an off chip L2 cache memory is employed, an optional L2 cache interface may be employed as well for interfacing to the L2 cache.

Figure 2:
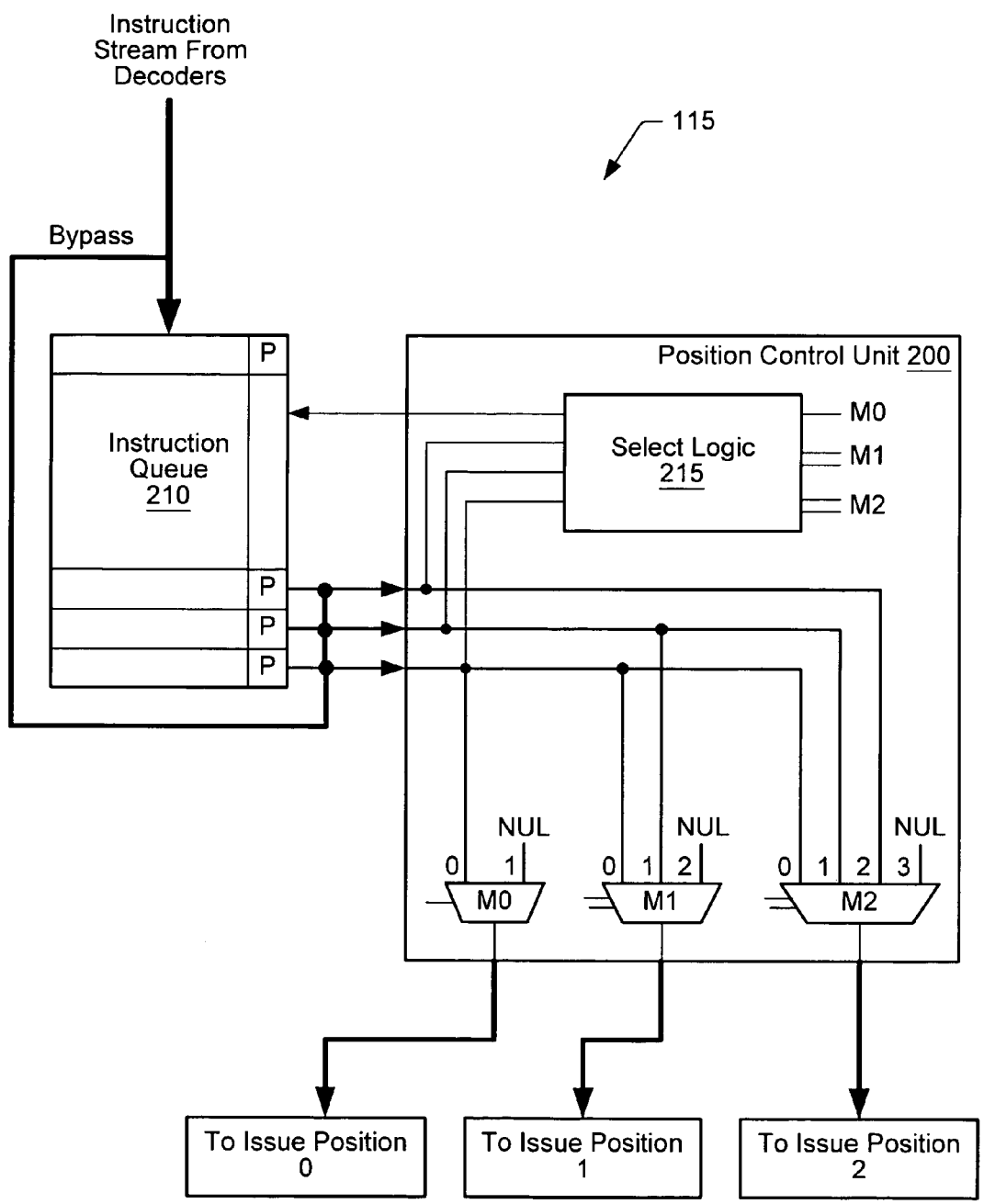
FIG. 2 is a block diagram of one embodiment of a dispatch control unit.

Referring to FIG. 2, a block diagram of one embodiment of a dispatch control unit 115 is shown. Components that correspond to those shown in FIG. 1 are numbered identically for simplicity and clarity. Dispatch control unit 115 may be configured to receive a stream of instructions from instruction decoders such as instruction decoders 104 of FIG. 1, for example, and to dispatch those instructions to issue positions 0, 1 and 2 of an execution pipeline such as execution pipeline 124 of FIG. 1. Dispatch control unit 115 includes a position control unit 200 coupled to an instruction queue 210. Position control unit 200 includes select logic 215 which is coupled to monitor and control incoming instructions. Position control unit 20 also includes multiplexers M0, M1 and M2, which are coupled to selectively route instructions to issue positions 0, 1 and 2, respectively.

In the illustrated embodiment, instruction queue 210 is configured to receive a plurality of instructions and to store them in the order they are received. The 'P' is used to illustrate that each instruction may include positional information which may indicate with which issue position that instruction is associated. For example, in one embodiment, the positional information may be a single bit indicating that the instruction is associated with a predetermined issue position (e.g., issue position 0). In alternative embodiments, the positional information may be a position vector including multiple bits. In such embodiments, each bit in the position vector may correspond to one issue position and the state of the bit may be indicative of which issue position the instruction should be routed. For example, a set bit may be indicative that the instruction should be routed to the corresponding issue position. If more than one bit is set, that instruction may be sent to any of the issue positions corresponding to the set bits. It is noted that when instruction queue 210 is empty, the instructions may bypass instruction queue 210 and be directly routed to position control unit 200. It is noted that alternative embodiments are contemplated in which a clear bit may be indicative that the instruction should be routed to the corresponding issue position.

In the illustrated embodiment, as instructions are received into instruction queue 210, the first received instruction may be routed to input 0 of each of multiplexers M0, M1 and M2. The second received instruction may be routed to input 1 of each of multiplexers M1 and M2 and the third received instruction may be routed to input 2 of multiplexer M2. Further, one input of each multiplexer is coupled to a NUL Op instruction. Any further incoming instructions may be stored in subsequent locations within instruction queue 210. Select logic 215 may evaluate each instruction's positional information to determine if the instruction has been placed in the issue position indicated by the positional information. If each instruction is correctly routed, select logic 215 may enable multiplexers M1 and M2 to dispatch the appropriate instruction to issue positions 1 and 2, respectively. As will be described further below, if a given instruction is not in the correct issue position, then the given instruction may be replicated to the next issue position until it is in the correct position.

To further illustrate the operation of dispatch control unit 115, table 1 includes three instructions arriving into instruction queue 210, while table 2 shows how the three instructions of table 1 may be dispatched into three issue positions of an execution pipeline and in which cycle.

In this example, the positional information is a 3-bit position vector where each bit corresponds to one issue position. A logical AND instruction is the first instruction having positional information indicative that any issue position may be used. The second instruction is a multiply instruction having positional information indicative that only issue position zero may be used. The third instruction is a logical OR instruction having positional information indicative that any issue position may be used. As noted above, in other embodiments, the MUL instruction may have a single positional bit indicating that it is associated with issue position zero.

TABLE 1

| Instruction | Position |
|---|---|
| OR | 111 |
| MUL | 100 |
| AND | 111 |

As described above, dispatch control unit 115 may dispatch multiple instructions to execution pipeline 124 each cycle to keep each stage of each execution unit as full as possible. Accordingly, in the first cycle of table 2 below, all three instructions may be provided to position control unit 200 such that the AND instruction is routed to all three issue positions. The MUL instruction is routed to issue positions 1 and 2 and the OR instruction is routed to issue position 3. Select logic 215 evaluates the position vectors and determines that the AND instruction may remain in issue position 0. However, the MUL instruction includes positional information indicating that it must be routed to issue position 0. Thus, select logic 215 may select the multiplexer inputs such that the AND instruction is issued to position 0 and NUL Ops are issued to positions 1 and 2 for cycle 1 as shown in Table 2. This effectively replicates the MUL and OR instructions to the next cycle. In one embodiment, instruction queue 210 may operate similar to a first in first out (FIFO) buffer, wherein a pointer may move up one location to indicate that the AND instruction is retired from the instruction queue 210. In cycle 2, the MUL instruction is routed to issue position 0, 1 and 2 and the OR instruction is routed to issue positions 1 and 2. Again select logic 215 evaluates the position vectors of the MUL and OR instructions. Since both the MUL and OR instructions are now in the correct issue positions, select logic may select input 0 of multiplexer M0, input 1 of multiplexer M1 and input 3 of multiplexer M2. In this example, two NUL Ops were dispatched in cycle 1 due to the MUL instruction. Accordingly, at some point in the execution pipeline, one stage in two different execution units may have bubbles in them. This may be an improvement over systems which use the MROM to force instructions to a predetermined issue position. Since using the MROM to force this same set of instructions to the same issue positions may use as many as four NUL Ops and 3 dispatch cycles which may cause as many as four bubbles in the execution pipeline.

TABLE 2

| Clock Cycle | Issue Position 0 | Issue Position 1 | Issue Position 2 |
|---|---|---|---|
| 1 | AND | NUL | NUL |
| 2 | MUL | OR | NUL |

It is noted that the embodiment of dispatch control unit 115 described above is for discussion purposes only and that alternative embodiments are contemplated in which position control unit 200 may employ additional and/or different logic for selecting and dispatching each instruction. In addition, alternative embodiments of dispatch control unit 115 are contemplated which do not include instruction queue 210. In such embodiments, position control unit 200 may dispatch each instruction as it is received.

It is further noted that a given microprocessor may have any number of execution units and corresponding issue positions. Accordingly, alternative embodiments of dispatch control unit 115 may include logic to dispatch instructions to any number of issue positions.

Figure 3:
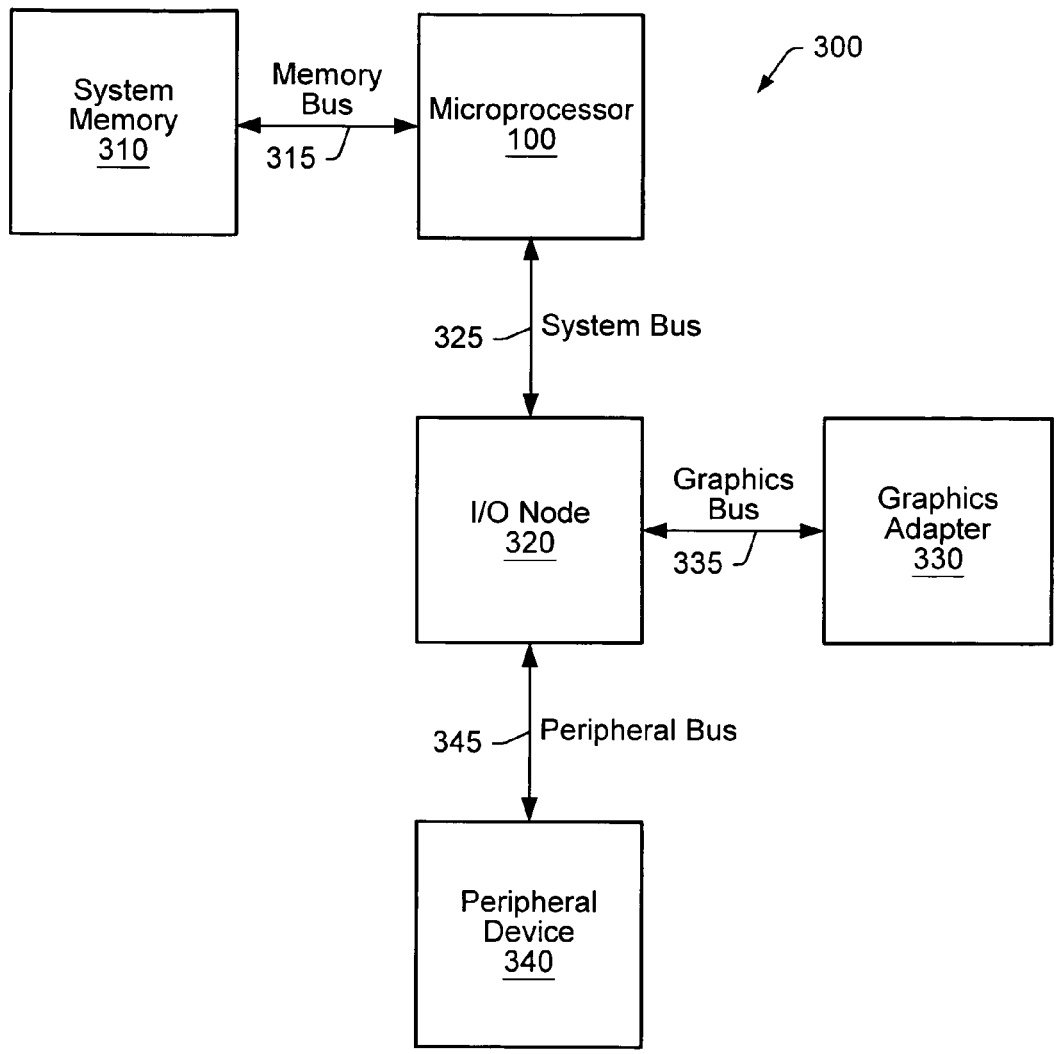
FIG. 3 is a block diagram of a computer system.

Turning to FIG. 3, a block diagram of one embodiment of a computer system including the microprocessor of FIG. 1 is shown. Components that correspond to those shown in FIG. 1 and FIG. 2 are numbered identically for clarity and simplicity. Computer system 300 includes a microprocessor 100 coupled to a system memory 310 via a memory bus 315. Microprocessor 100 is further coupled to an I/O node 320 via a system bus 325. I/O node 320 is coupled to a graphics adapter 330 via a graphics bus 335. I/O node 320 is also coupled to a peripheral device 340 via a peripheral bus.

In the illustrated embodiment, microprocessor 100 is coupled directly to system memory 310 via memory bus 315. Thus, microprocessor may include a memory interface (not shown in FIG. 3) for controlling accesses to system memory 310. It is noted however that in other embodiments, system memory 310 may be coupled to microprocessor 100 through I/O node 320. In such an embodiment, I/O node 320 may include a memory interface (not shown).

System memory 310 may include any suitable memory devices. For example, in one embodiment, system memory may include one or more banks of dynamic random access memory (DRAM) devices. Although it is contemplated that other embodiments may include other memory devices and configurations.

In the illustrated embodiment, I/O node 320 is coupled to a graphics bus 335, a peripheral bus 340 and a system bus 325. Accordingly, I/O node 720 may include a variety of bus interface logic (not shown) which may include buffers and control logic for managing the flow of transactions between the various buses. In one embodiment, system bus 325 may be a packet based interconnect compatible with the Hyper-Transport™ technology. In such an embodiment, I/O node 320 may be configured to handle packet transactions. In alternative embodiments, system bus 325 may be a typical shared bus architecture such as a front-side bus (FSB), for example.

Further, graphics bus 335 may be compatible with accelerated graphics port (AGP) bus technology. In one embodiment, graphics adapter 330 may be any of a variety of graphics devices configured to generate and display graphics images for display. Peripheral bus 345 may be an example of a common peripheral bus such as a peripheral component interconnect (PCI) bus, for example. Peripheral device 340 may any type of peripheral device such as a modem or sound card, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor comprising:
   a plurality of execution units each corresponding to an issue position and configured to execute a common subset of instructions, wherein at least a first one of said plurality of execution units includes extended logic configured to execute a designated instruction that others of said plurality of execution units are incapable of executing;

a plurality of decoders coupled to said plurality of execution units, wherein said plurality of decoders is configured to provide positional information to cause said designated instruction to be routed to said first one of said plurality of execution units; and a dispatch control unit coupled to said plurality of decoders and configured to dispatch during a dispatch cycle, said designated instruction for execution by said first one of said plurality of execution units based upon said positional information;

wherein said dispatch control unit is further configured to dispatch one or more instructions within said common subset of instructions during the same dispatch cycle.

2. The microprocessor as recited in claim 1, wherein said dispatch control unit includes an instruction queue configured to store pending ones of said common subset of instructions and said designated instruction and to output for dispatch one or more of said pending instructions in each dispatch cycle.

3. The microprocessor as recited in claim 1, wherein said dispatch control unit is further configured to dispatch up to one pending instruction to each of said issue positions each dispatch cycle.

4. The microprocessor as recited in claim 1, wherein each of said plurality of decoders is further configured to determine said positional information in response to decoding a given instruction into said designated instruction.

5. The microprocessor as recited in claim 1, wherein each of said plurality of decoders is further configured to access an opcode look-up table including said positional information.

6. The microprocessor as recited in claim 1, wherein said designated instruction is executed by said first one of said plurality of execution units in the same execution cycle as said one or more instructions within said common subset of instructions is executed by said others of said plurality of execution units.

7. The microprocessor as recited in claim 1, wherein said positional information is a position bit which indicates that said designated instruction is associated with an issue position corresponding to said first execution unit.

8. The microprocessor as recited in claim 1, wherein said positional information is a position vector including a plurality of bits, each corresponding to a respective one of said issue positions.

9. The microprocessor as recited in claim 1, wherein each of said plurality of execution units is implemented in a plurality of pipeline stages.

10. A computer system comprising:

a system memory configured to store a plurality of instructions; and a microprocessor coupled to said system memory and configured to execute said plurality of instructions, wherein said microprocessor includes:

a plurality of execution units each corresponding to an issue position and configured to execute a common subset of said plurality of instructions, wherein at least a first one of said plurality of execution units includes extended logic configured to execute a designated instruction that others of said plurality of execution units are incapable of executing;

a plurality of decoders coupled to said plurality of execution units, wherein said plurality of decoders is configured to provide positional information to cause said designated instruction to be routed to said first one of said plurality of execution units; and a dispatch control unit coupled to said plurality of decoders and configured to dispatch during a dispatch cycle, said designated instruction for execution by said first one of said plurality of execution units based upon said positional information;

wherein said dispatch control unit is further configured to dispatch one or more instructions within said common subset of instructions during the same dispatch cycle.

11. The computer system as recited in claim 10, wherein said dispatch control unit includes an instruction queue configured to store pending ones of said common subset of instructions and said designated instruction and to output for dispatch one or more of said pending instructions in each dispatch cycle.

12. The computer system as recited in claim 10, wherein said dispatch control unit is further configured to dispatch up to one pending instruction to each of said issue positions each dispatch cycle.

13. The computer system as recited in claim 10, wherein each of said plurality of decoders is further configured to determine said positional information in response to decoding a given instruction into said designated instruction.

14. The computer system as recited in claim 10, wherein each of said plurality of decoders is further configured to access an opcode look-up table including said positional information.

15. The computer system as recited in claim 10, wherein said designated instruction is executed by said first one of said plurality of execution units in the same execution cycle as said one or more instructions within said common subset of instructions is executed by said others of said plurality of execution units.

16. The computer system as recited in claim 10, wherein said positional information is a position bit which indicates that said designated instruction is associated with an issue position corresponding to said first execution unit.

17. The computer system as recited in claim 10, wherein said positional information is a position vector including a plurality of bits, each corresponding to a respective one of said plurality of execution units.

18. The computer system as recited in claim 10, wherein said each of said plurality of execution units is implemented in a plurality of pipeline stages.

19. A method of dispatching instructions, said method comprising:

executing a common subset of a plurality of instructions using a plurality of execution units each corresponding to an issue position, wherein at least a first one of said plurality of execution units includes extended logic configured to execute a designated instruction that others of said plurality of execution units are incapable of executing;

providing positional information to cause said designated instruction to be routed to said first one of said plurality of execution units;

dispatching during a dispatch cycle, said designated instruction for execution by said first one of said plurality of execution units based upon said positional information;

dispatching one or more instructions within said common subset of instructions during the same dispatch cycle and further comprising determining said positional information in response to decoding a given instruction into said designated instruction.

20. The method as recited in claim 19, wherein said positional information is a position bit which indicates that said designated instruction is associated with an issue position corresponding to said first execution unit.

21. The method as recited in claim 19 further comprising dispatching up to one pending instruction to each of said issue positions each dispatch cycle.

* * * * *